Jan. 27, 1970  W. H. BURGER  3,492,185
APPARATUS FOR FORMING A MULTI-PLY WEB PRODUCT
Filed Dec. 27, 1966  8 Sheets-Sheet 1

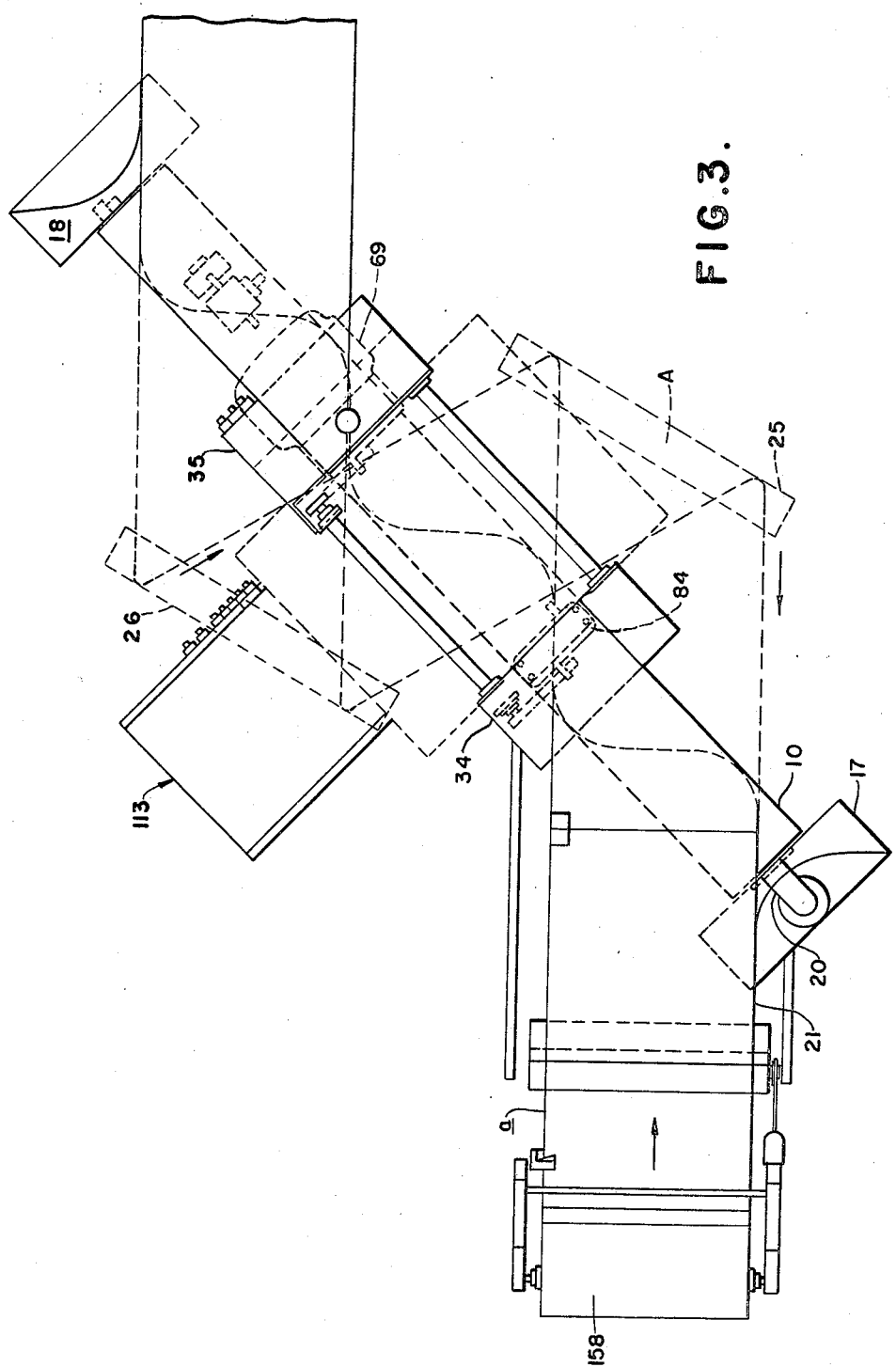

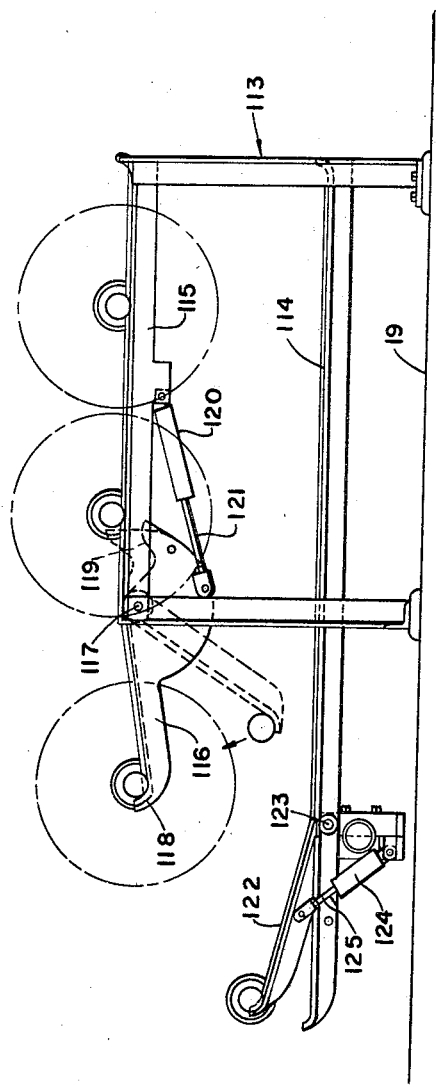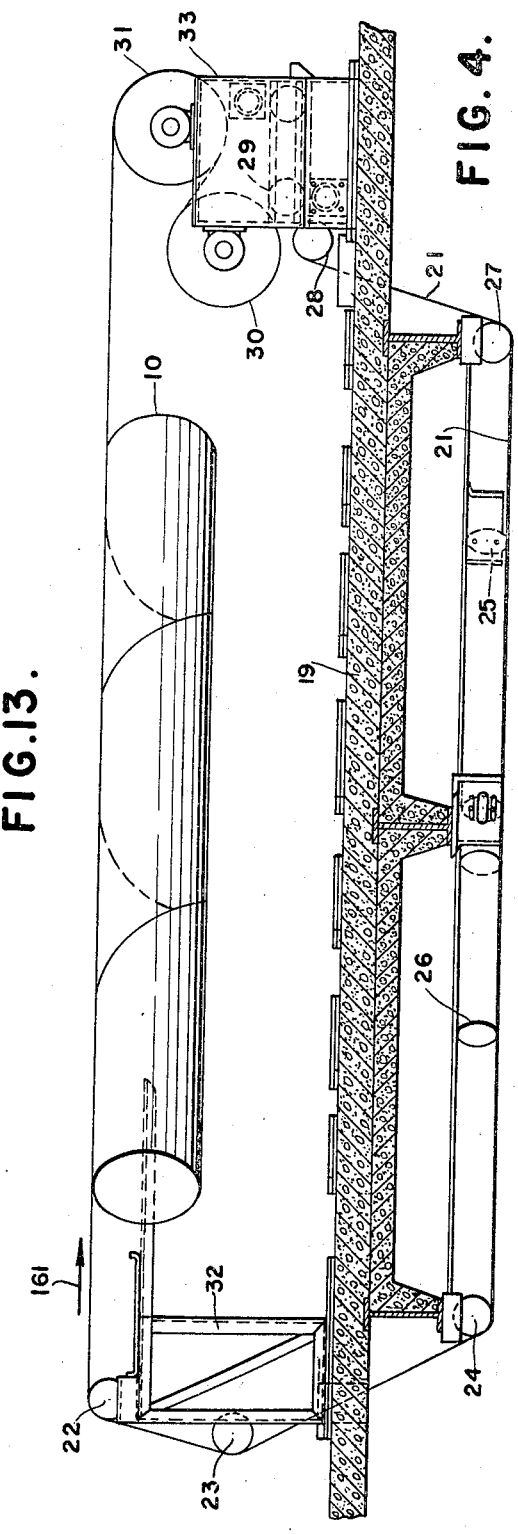

Jan. 27, 1970     W. H. BURGER     3,492,185
APPARATUS FOR FORMING A MULTI-PLY WEB PRODUCT
Filed Dec. 27, 1966     8 Sheets-Sheet 5

Jan. 27, 1970 W. H. BURGER 3,492,185
APPARATUS FOR FORMING A MULTI-PLY WEB PRODUCT
Filed Dec. 27, 1966 8 Sheets-Sheet 6

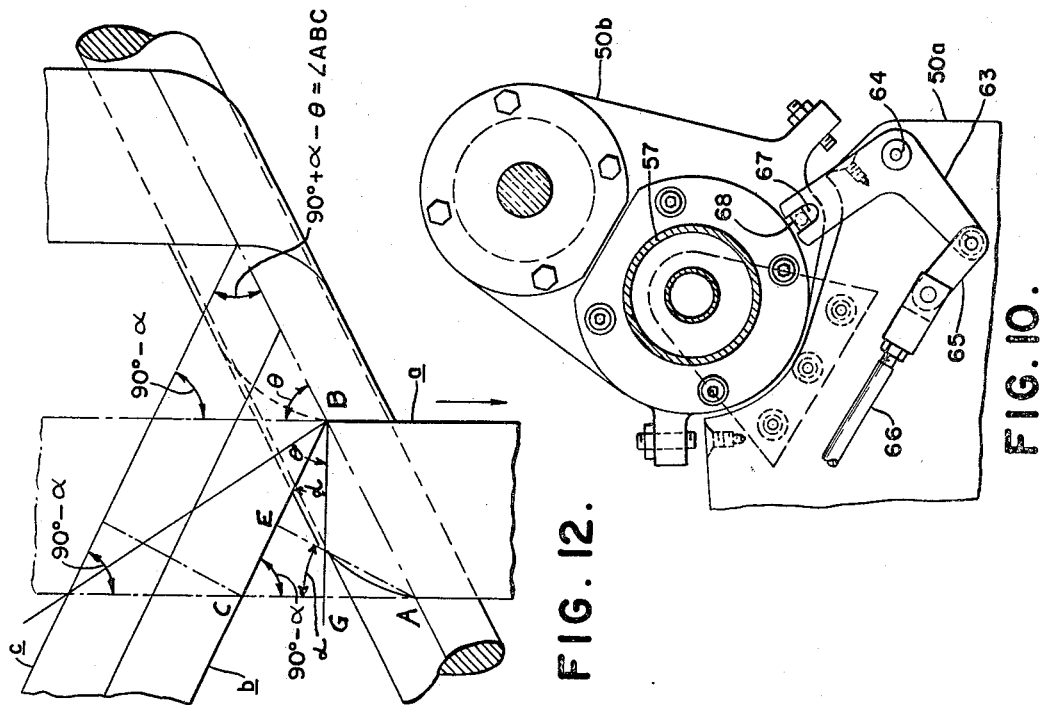
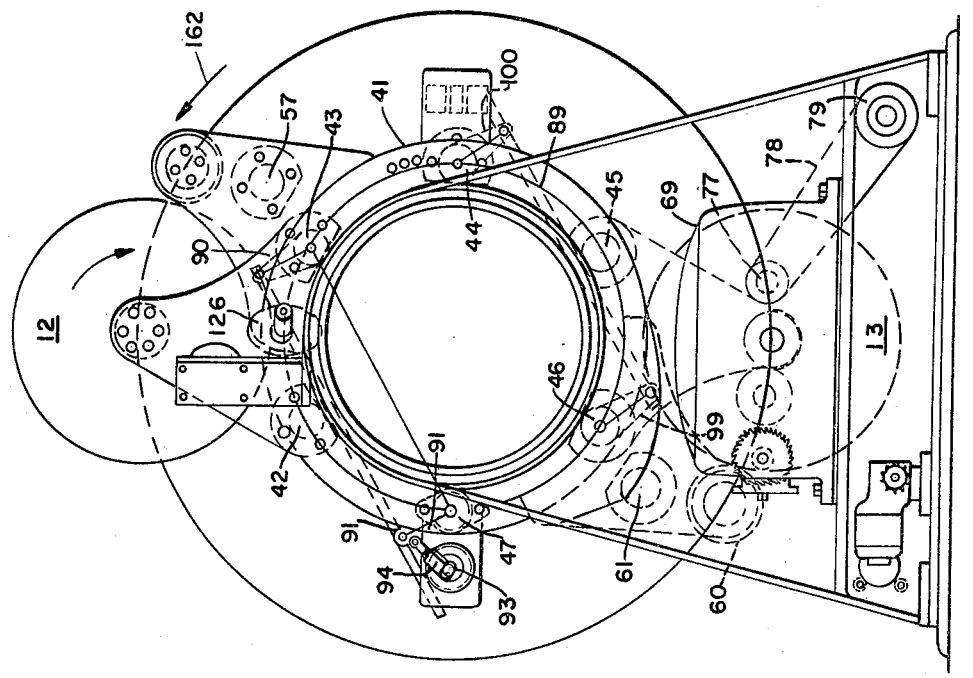

United States Patent Office 3,492,185
Patented Jan. 27, 1970

3,492,185
APPARATUS FOR FORMING A MULTI-PLY
WEB PRODUCT
William H. Burger, Neenah, Wis., assignor to Kimberly-Clark Corporation, Neenah, Wis., a corporation of Delaware
Filed Dec. 27, 1966, Ser. No. 604,705
Int. Cl. B31c 9/00
U.S. Cl. 156—425                                      12 Claims

ABSTRACT OF THE DISCLOSURE

An apparatus for making a multi-ply web and having a central mandrel carrying a first web movable helically about it and a carrier rotatably disposed about the mandrel and carrying satellite rolls of web material disposed with their axes parallel to the axis of the mandrel from which web is wound helically onto the first web. The apparatus includes an adjustable guide bar for the web from one of the satellite rolls and rollers for peripherally driving each of the satellite rolls for adjusting the tension on the webs from the satellite rolls and for adjusting the gap between the webs from these rolls as they are wound on the first web.

BACKGROUND OF THE INVENTION

The invention relates to apparatus for forming a multi-ply web in which the long dimension of one web ply extends transversely across the other web ply.

It has previously been proposed, particularly in a patent to H. W. Hirschy, No. 2,841,202, to make a multi-ply web product comprising a first web having segments of a second web extending across the first web by passing the first web helically about a mandrel and helically applying a second web on top of the first web by means of a carrier carrying a satellite roll of the second web and rotatably disposed about the mandrel with its axis substantially in alignment with the axis of the mandrel, and then cutting along the edges of the first web so as to form the web segments of the second web positioned on the first web.

Summary of the invention

It is an object of the present invention to mount such a satellite roll in a carrier with its longitudinal axis extending parallel with the axes of the carrier and mandrel so that, particularly when such a roll is large and heavy, mechanical loading apparatus can be more easily used for mounting the roll in place in the carrier. It is also an object of the invention to provide an adjustable guide for the web from such a satellite roll so that the overlap of successive turns from the satellite roll and from a duplicate roll mounted on the other side of the carrier may be easily controlled.

It is a further object of the invention to provide mechanism for holding the segments of such a second web onto the first web as the first web travels in its path subsequent to cutting of the second web into segments, so that windage does not disturb the segments of the second web.

In a preferred form of the apparatus, a carrier is rotatably disposed about a mandrel movably carrying a helical belt on which a first web is disposed, and the carrier carries a pair of satellite rolls of web material on opposite sides of the carrier axis for helically winding the web material from the satellite rolls onto the first web. A guide bar is provided for the web from each of the satellite rolls, and one of the guide bars is adjustable so that the positioning of one of the webs from one of the satellite rolls may be changed with respect to the other web from the other satellite roll to control the overlap of the web from the two satellite rolls. Each of the satellite rolls is driven by a drive roll in contact with the satellite roll so as to control the tension on the web from each satellite roll. A cutter is effective along the edge of the first web so as to sever the webs from the satellite rolls into segments lying on the first web, and a plurality of movable spaced belts have passes of them in substantial contact with the first web after it leaves the cutter for holding the segments of webs from the satellite rolls in place on the first web to prevent disturbance due to windage.

The invention consists of the novel constructions, arrangements and devices in cross-laying and laminating apparatus to be hereinafter described and claimed for carrying out the above stated objects, and such other objects, as will be apparent from the following description of a preferred form of the invention.

Brief description of the drawings

FIG. 3 is a plan view of the crosslaying part of the apparatus;
FIG. 4 is a side elevational view of a web carrying belt incorporated in the crosslaying part of the apparatus and including rolls for supporting the belt;
FIG. 8 is an end view of the crosslaying part of the apparatus taken from line 8—8 of FIG. 5;
FIG. 10 is a fragmentary view taken on line 10—10 of FIG. 5;
FIG. 12 is a diagrammatic illustration of the paths of travel of sheet material webs in the crosslaying part of the apparatus;
and
FIG. 13 is a side elevational view of a mechanism for supplying satellite rolls of web material to the crosslaying part of the apparatus and for removing the cores of exhausted satellite rolls.

Like reference characters designate like parts in the several views.

Description of the preferred embodiment

Figures 1, 2:
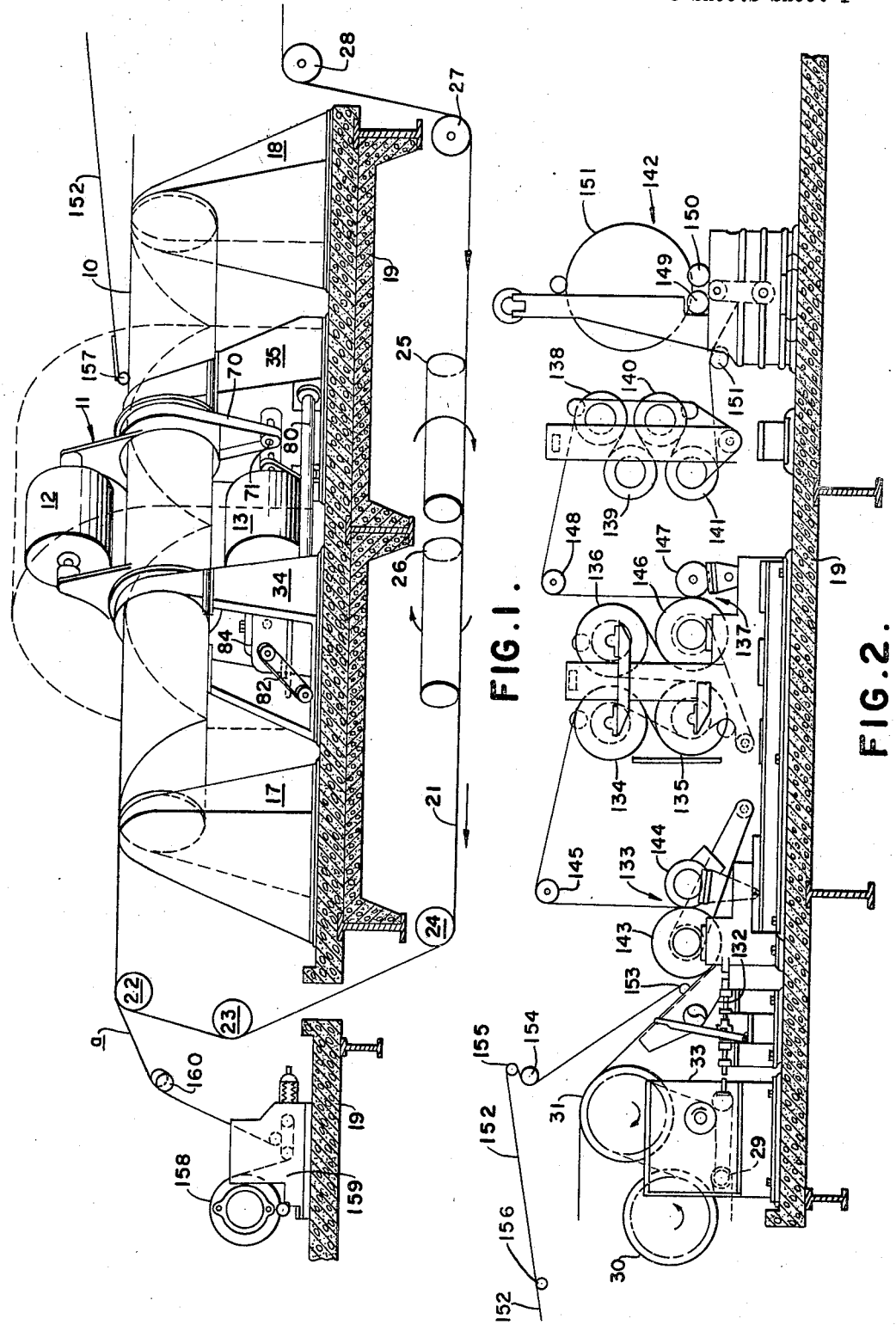
FIG. 1 is a side elevational view of the crosslaying part of the apparatus.
FIG. 2 is a side elevational view of the terminal end of the apparatus which follows the apparatus illustrated in FIG. 1.
Figure 5:
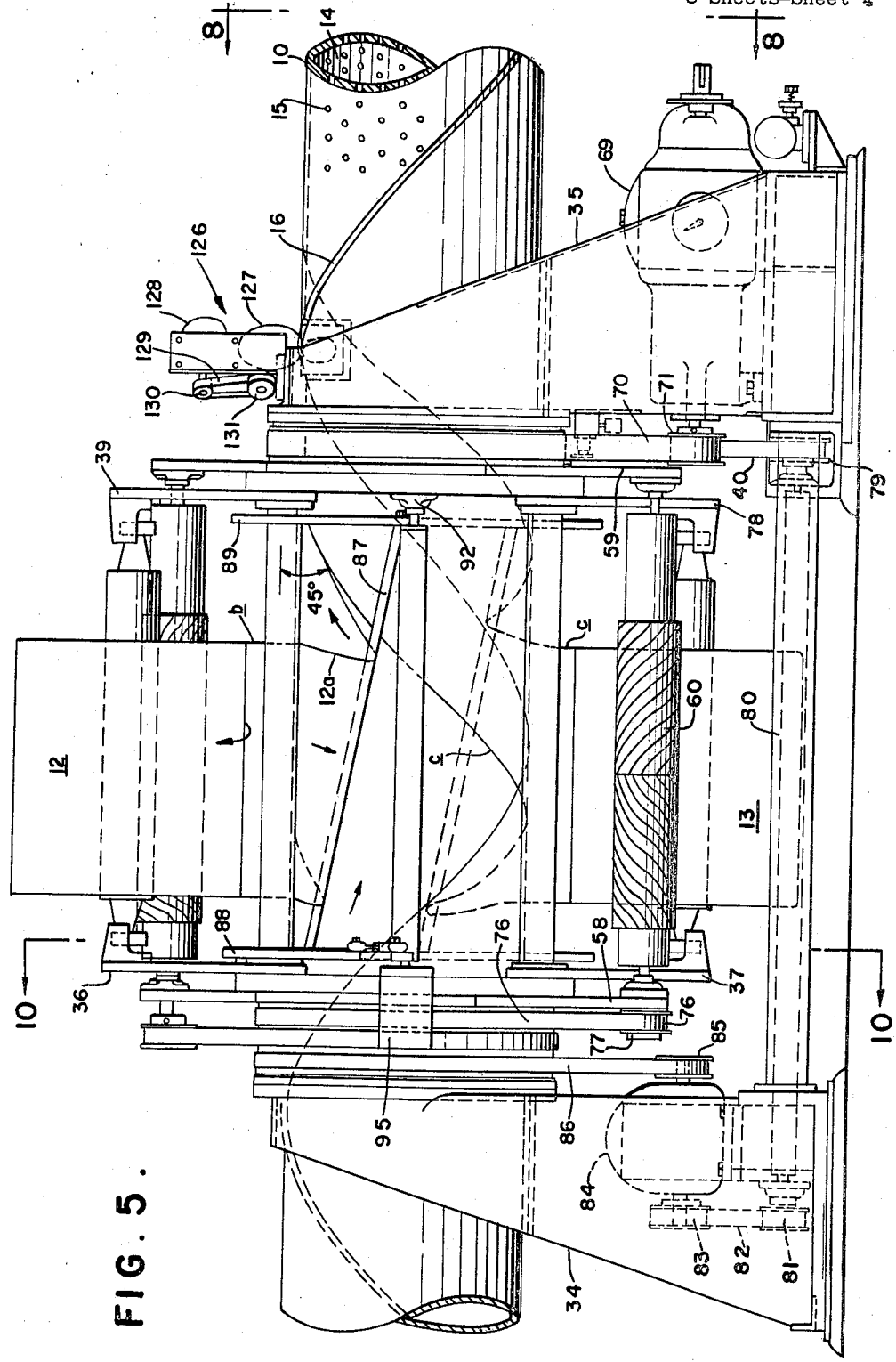
FIG. 5 is a side elevational view of the crosslaying part of the apparatus.

Referring now to the drawings and to FIGS. 1 and 5 in particular, the illustrated crosslaying part of the apparatus comprises generally a central mandrel 10 and a spider or cage 11 rotatably disposed about the mandrel 10 and carrying a pair of satellite rolls 12 and 13 of sheet material.

The mandrel 10 is in the form of a hollow cylindrical shell with an internal cavity 14. The mandrel 10 has a plurality of air discharge openings 15 therein and has a spiral radially extending rib 16 fixed on its outer surface. The mandrel 10 is closed on its opposite ends and is fixed on its ends in standards 17 and 18 resting and fixed on a floor 19. A conduit 20 (see FIG. 3) is connected through the standard 17 with the interior of the mandrel 10 and is supplied with air under pressure.

An endless belt 21 is helically wound about the mandrel 10, with the rib 16 being disposed between the turns of the belt 21; and the belt extends over rolls 22, 23 and 24, stationary mandrels 25 and 26, and rolls 27, 28, 29, 30 and 31 (see FIGS. 1 and 2). The rolls 22 and 23 are rotatably disposed in a framework 32; the rolls 24 and 27 are rotatably disposed attached to floor beams; and the rolls 29, 30 and 31 are rotatably disposed in a framework 33. The rolls 30 and 31 are driven from any suitable prime mover (not shown) for the purpose of driving the belt 21 about the rolls, and the roll 29 is preferably mounted within the framework 33 so as to be adjustable horizontally within the framework for the purpose of tightening the belt 21 as desired. The stationary mandrels 25 and 26 are disposed on the underside of the floor 19 by any suitable supporting structure.

The spider 11 is disposed about the mandrel 10 and is rotatably carried by means of a pair of standards 34 and 35 resting on and fixed to the floor 19, so that the spider 11 may rotate about the fixed mandrel 10 (see FIGS. 1 and 5). The spider 11 comprises a pair of outwardly extending arms 36 and 37, which are fixed with respect to an outer bearing shell 38, and a pair of outwardly extending arms 39 and 40, which are fixed with respect to an outer bearing shell 41 (see FIG. 7, also). Six connecting rods 42, 43, 44, 45, 46 and 47 in the form of pipes extend between the arms 36 and 37 on one side and arms 39 and 40 on the other side and also between the outer bearing shells 38 and 41 so as, in effect, to form a unitary spider 11 (see FIG. 8, also). The outer bearing shells 38 and 41 are respectively mounted with respect to cylindrical portions 34a and 35a of the standards 34 and 35 by means of bearings 48 and 49.

A pair of arms 50 and 51 (see FIG. 7) are fixed on outer bearing races 52 and 53, and bearings 54 and 55 rotatably mount these races and arms on the outer bearing shells 38 and 41. A roller 56 having a herringbone pattern cut in its external surface extends between and is rotatably disposed with respect to the arms 50 and 51. A connecting rod 57 (see FIG. 9) in the form of a pipe is fixed between and with respect to the arms 50 and 51 so that the arms swing together about the bearings 54 and 55.

A pair of arms 58 and 59 (see FIG. 5), which are similar to the arms 50 and 51, are also fixed to the bearing races 52 and 53; and the arms 58 and 59 carry a roll 60 between them. The roll 60 is similar to the roll 56 and has a herringbone pattern cut into its external surface and is rotatably disposed with respect to the arms 58 and 59. The arms 58 and 59 are also rigidly connected together and with respect to each other by means of a connecting rod 61 (see FIG. 8) which is similar to the rod 57.

The arm 50 is articulated (see FIG. 10), being made up of arm portions 50a and 50b. The arm portion 50b is swingably mounted on the rod 57 and is moved, along with the arm portion 50a, toward the adjacent satellite roll 12 by means of an air cylinder 62 (see FIG. 9) which is fixed on the adjacent arm 36. A bell crank 63 is swingably mounted with respect to the arm portion 50a by means of a pin 64, and the inner end of the bell crank 63 is connected to an air cylinder 62 by means of links 65 and 66. The other end of the bell crank 63 has a pin 67 and slot 68 connection with the arm portion 50b. The opposite arm 51 is articulated in the same manner as the arm 50 and is controlled by an air cylinder 62 which is fixed on the arm 39; and the arrangement is such that when the air cylinders 62 for the articulated arms 50 and 51 are energized, they turn the bell cranks 63 so that the arm portion 50b and the similar arm portion 51b of the arm 51 rotate counter-clockwise as seen in FIG. 10, and the arm portions 51a and 50a also rotate on the bearings 54 and 55 in this direction, so as to move the herringbone roll 56 toward and into forceful contact with the adjacent satellite roll 12.

The two arms 58 and 59 for the herringbone roll 60 are articulated and are controlled by air cylinders 62 similarly as are the arms 50 and 51 as just described. The herringbone roll 60 may thus be moved toward the satellite roll 13 in the same manner as the herringbone roll 56 is moved toward the satellite roll 12 as just described.

The outer shell portion 41 and thereby the spider 11, as a whole, are driven from a power drive unit 69 by means of a belt 70. The power drive unit 69 is driven from the same prime mover (not shown) that drives the rolls 30 and 31 for the belt 21 so the movements of the belt 21 and spider 11 are synchronized or are in timed relation. The belt 70 is of the type that is internally toothed and meshes with external teeth formed on the outer bearing shell 41 and on a sprocket 71 constituting an output member of the power drive unit 69.

The herringbone rolls 56 and 60 are driven from an outer bearing shell 72 (see FIG. 7) which is rotatably disposed on the cylindrical portion 34a of the standard 34 by means of a bearing 73. The herringbone roll 56 has a driving sprocket 74 fixed to it, and an internally toothed belt 75 extends over the sprocket 74 and also over the outer bearing shell 72. The exterior surfaces of both the sprocket 74 and shell 72 are formed with teeth so as to mesh with the internal teeth of the belt 75.

The herringbone roll 60 is driven from the outer bearing shell 72 by means of an internally tooted belt 76 which is similar to the belt 75. An externally toothed sprocket 77 (see FIG. 5) is fixed to the roll 60, and the belt 76 extends over the sprocket 77 and also over the bearing shell 72.

The bearing shell 72 and thereby the herringbone rolls 56 and 60 are also driven from the drive unit 69. The drive from the unit 69 is through an externally toothed sprocket 77 (see FIG. 8) constituting an output member of the unit 69, an internally toothed belt 78 in mesh with the sprocket 77, an externally toothed sprocket 79, a drive shaft 80 on which the sprocket 79 is fixed, an externally toothed sprocket 81 also fixed on the shaft 80 (see FIG. 5), an internally toothed belt 82 extending over the sprocket 81, an externally toothed sprocket 83, a positively adjustable speed change device 84, an externally toothed sprocket 85 and an internally toothed belt 86 extending over the sprocket 85 and also over the externally toothed bearing shell 72.

Figure 6:
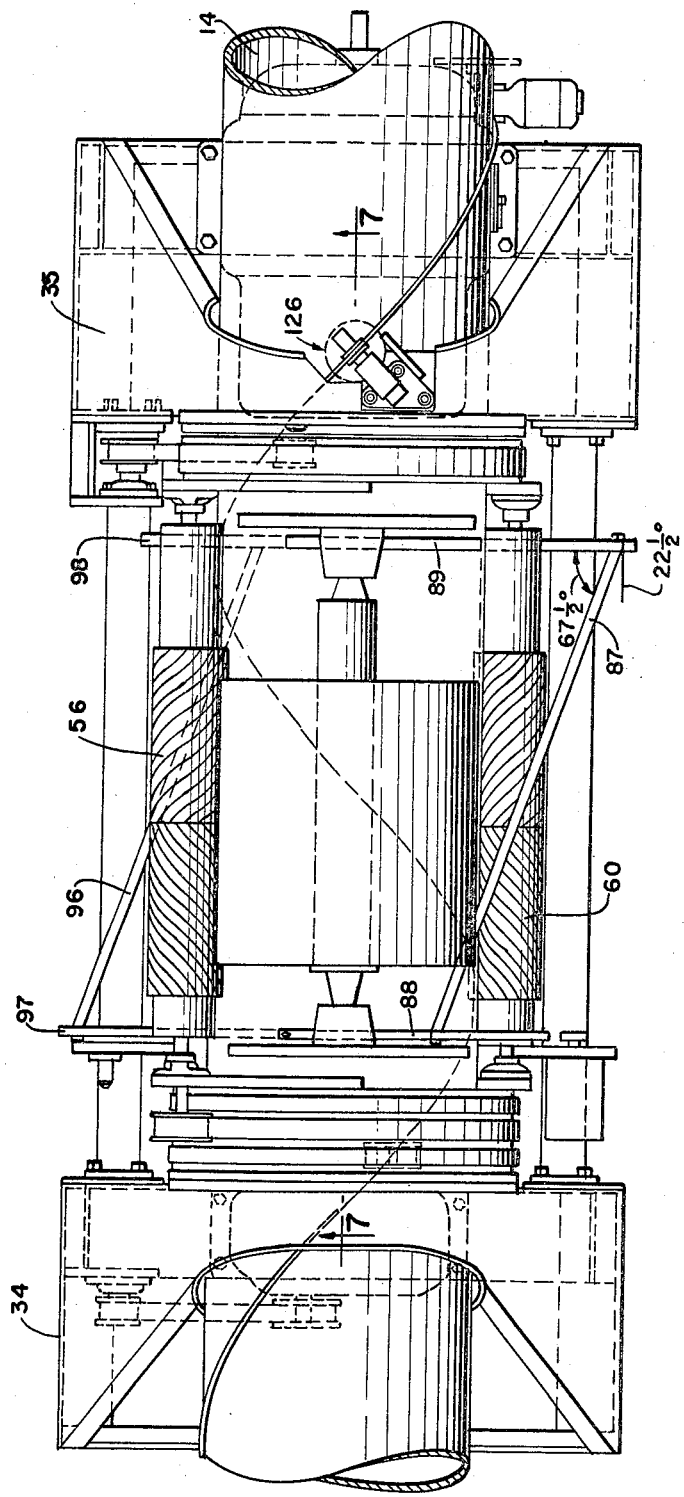
FIG. 6 is a plan view of the crosslaying part of the apparatus.

A sheet guide bar 87 is mounted diagonally between two support bars 88 and 89 (see FIG. 6). The bars 88 and 89 are each pivoted on the end of a lever 90 (see FIG. 8) which is rotatably disposed on the rod 43. The bars 88 and 89 are also pivotally mounted on levers 91 that are fixed to the rod 47, and the rod 47 is rotatably mounted with respect to the rest of the spider 11 by means of bearings 92 (see FIG. 5). An eccentric 93 is connected by means of a link 94 with one of the levers 91 for thereby oscillating the two levers 91 and the rod 47 connecting the two levers 91 together, together with the bars 87, 88 and 89. The eccentric 93 is driven from a motor 95 carried by the spider 11.

A diagonally extending sheet guide bar 96 is provided opposite the bar 87. The guide bar 96 is fixedly mounted between bars 97 and 98, and the bars 97 and 98 are each mounted on opposite arms 99 and 100. The arms 99 are fixed with respect to the rod 46, and the arms 100 are fixed with respect to the rod 44. The rods 44 and 46 form fixed parts of the spider 11 and the three bars 96, 97 and 98 are thus fixed with respect to the rest of the spider 11.

It will be observed from FIG. 8 that the plane defined by the bars 87, 88 and 89 is located very close to and parallel to the periphery of the belt 21 carried by the mandrel 10, and the same is true of the plane defined by the bars 96, 97 and 98. The two sheet guide bars 87 and 96 are thus located in planes which extend parallel to the axis of the mandrel 10. The guide bar 96 is fixed with respect to the rest of the spider 11; however, the guide bar 87 is movable to a slight extent in the plane defined by the bars 87, 28 and 89 as the motor 95 is energized to turn the eccentric 93. Except for this slight movement of the guide bar 87, the diagonally opposite ends of the sheet guide bars 87 and 96 are located the same distance away from the center line of the mandrel 10. Referring to FIG. 6, the left end of the guide bar 87, as it is illustrated in this figure, is located substantially the same distance from the axis of the mandrel 10 as is the right end of the guide bar 96; and likewise the right end of the guide bar 87 is located substantially the same distance from the axis of the mandrel 10 as is the left end of the guide bar 96.

Figure 7:
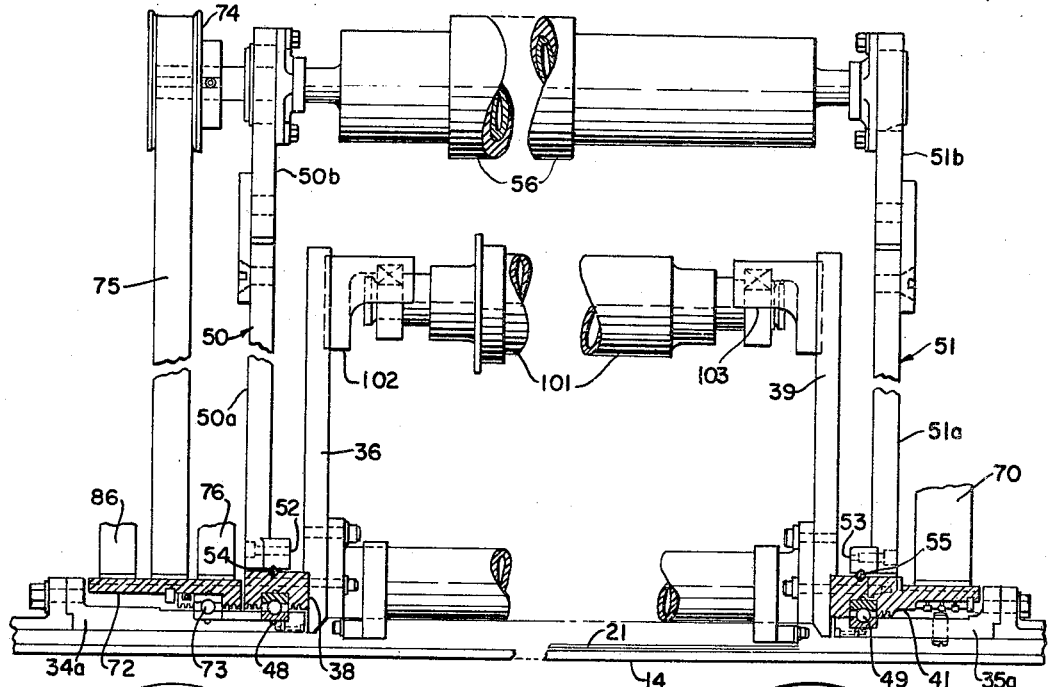
FIG. 7 is a sectional view of a portion of the apparatus taken substantially on line 7—7 of FIG. 6.

Each of the satellite rolls 12 and 13 is mounted on a central core 101 (see FIG. 7). The ends of each core 101 fit in saddles 102 and 103 carried respectively on arms 36 and 39 and on arms 37 and 40. Each of the saddles 102 and 103 has an enveloping cover such as the cover 104 illustrated for the saddle 103 on the arm 40 (see FIG. 11). The cover 104 is swingably mounted about a shaft 105 fixed on the arm 40, and a toggle linkage 106 is provided for swinging the cover 104 about the shaft 105 so as to allow the core 101 to move out of the saddle. The toggle linkage 106 comprises a lever 107 having a hinged connection with the cover 104 and a lever 108 pivotally connected to the lever 107 by means of a pin 109 and also pivotally mounted by means of a pin 110 onto the arm 40. An air cylinder 111 has a plunger 112 protruding from one end of it, with the plunger being connected to the lever 108; and the air cylinder 111 is swingably mounted at its other end to the arm 40, the arrangement being such that when the plunger 112 moves outwardly from the air cylinder 111, it collapses the toggle linkage 106 and swings the cover 104 away from the saddle 103.

The satellite rolls 12 and 13 may be mounted with their cores 101 fitting in the saddles 102 and 103 by means of the mounting apparatus shown in FIG. 13. The mounting apparatus comprises a frame 113 having horizontal beams 114 and 115. A pair of arms 116 are swingably mounted by means of pins 117 on ends of the beams 115, and the arms 116 are formed to have saddle portions 118 on one end and saddle portions 119 on the other end. A fluid pressure cylinder 120 is provided for each of the arms 116 and is swingably mounted to a beam 115 on one end and has a plunger 121 extending from it on its other end which is connected to one of the arms 116.

The horizontal beams 114 carry arms 122 swingably mounted on their ends to the beams 114 by means of pins 123. An air cylinder 124 is provided for each of the arms 122, and each air cylinder is swingably mounted on the frame 113 and has a plunger 125 protruding from its other end which is connected to an arm 122.

The frame 113 is mounted on the floor 19 between the standards 34 and 35 (see FIG. 3). A core 101 of an exhausted satellite roll 12 or 13 may be removed from its supporting saddles 102 and 103 and may be replaced by a full satellite roll by means of the mounting apparatus shown in FIG. 13, as will be hereinafter more fully described.

The belt 21 carries a web a of sheet material on its outer surface around the mandrel 10; and the satellite rolls 12 and 13 rotate along with the spider 11 about the mandrel 10; and the webs b and c from the rolls 11 and 12 are cross laid with respect to the web a from the roll 12, as will be more fully hereinafter described. The webs b and c from the rolls 12 and 13 are slit at the edges of the web a so as to provide segments of the webs b lying transversely across the web a, and a slitter (see FIGS. 5 and 8) is provided for this purpose. The slitter 126 comprises a slitter wheel 127 which is sharpened to have a sharp peripheral edge and which is driven from a motor 128 by means of a belt 129 passing over pulleys 130 and 131.

The web a, with the segments of the webs b and c from the rolls 12 and 13 lying across it, travels along with the belt 21 to the roll 31; and from thence the web a, with the cross laid segments of the webs b and c thereon, travels over a vacuum box 132, through a heated calender 133, over heated rolls 134, 135 and 136, through a heated calender 137, over cooling rolls 138, 139, 140 and 141 and from thence to a winder 142 (see FIG. 2). The calender 133 comprises a heated roll 143 and a roll 144 having a pressure nip with the roll 143, and the composite web ABC is guided from the calender 133 to the heated roll 134 by a guide roll 145. The calender 137 comprises a heated roll 146 and a roll 147 having a pressure nip with the roll 146, and the composite web is guided from the calender 137 to the cooling roll 138 by a guide roll 148. The winder 142 may be of any suitable type comprising, for example, a pair of spaced supporting rolls 149 and 150 on which a roll 151 of the composite web rests; and suitable guide rolls, such as the roll 151, may be provided for guiding the composite web into the winder 142.

It is contemplated that the web a and also the webs b and c from the satellite rolls 12 and 13 shall include thermoplastic material and that the heated calender 133, as well as the heated calender 137 and heated rolls 134, 135 and 136, shall thus have the effect of bonding the cross laid pieces of the webs b and c from the satellite rolls 12 and 13 to the main web a. It is desired that the segments of the webs b and c from the satellite rolls 12 and 13 positioned across the main web a, as it travels along with the belt 21 from the mandrel 10 to the roll 31 and to the suction box 132, shall remain smoothly positioned across the web a; and, for assuring that windage does not cause dislocation of the cross laid pieces of webs b and c, relatively small diameter round belts 152, 152a, 152b, 152c, 152d and 152e are provided. These belts are spaced crosswise of the belt 21 as it passes from the mandrel 10 to the roll 31, and they extend from the roll 31 down along the suction box 132. The belt 152, for example, passes around a pulley 153 positioned above the suction box 132 and passes from 155, 156 and 157 (see FIGS. 1 and 2). The the pulley 153 back to the mandrel 10 around pulleys 154, other belts 152a, 152b, etc., respectively, pass around similar pulleys 153a, 153b, etc., 154a, 154b, etc., 155a, 155b, etc., 156a, 156b, etc., and 157a, 157b, etc.

The web a is supplied to the belt 21 from a roll 158 of the web material which is supported by any suitable standards 159 positioned on the floor 19 ((see FIG. 1). The web a from the roll 158 passes over suitable guide and tension rolls including a Mount Hope bent roll 160 which assures that the web a is supplied onto the belt 21 without longitudinal wrinkles.

In operation, the belt 21 is driven in the direction indicated by the arrow 161 in FIG. 4 about its supporting rolls 22 to 31. The mandrel 10 is supplied with air under pressure from the conduit 20, and the air blown through the openings 15 floats the belt 21 about the mandrel 10. The belt 21 thus moves helically about the mandrel 10 from the roll 22 to the roll 31, and the rib 16 extends helically about the mandrel 10 and spaces adjacent turns of the belt 21 as it passes about the mandrel 10.

The web a is drawn off the web supply roll 158 onto the belt 21 as the belt passes over the roll 22, and the web a thus travels with the belt 21 helically about the mandrel 10. The web a leaves the belt 21 at the roll 31 and travels to the calender 133; however, after leaving the mandrel 10 the web a has segments of webs b and c positioned across it, as will be hereinafter described.

The cage 11 is rotated in the direction of the arrow 162 (see FIG. 8). The drive for the cage 11 is from the power drive unit 69 and is through the belt 70 which is in mesh with the sprocket 71 and with the teeth on the outer bearing shell 41 having the arms 36, 37, 39 and 40 fixed thereto, as hereinbefore explained. The power drive unit 69 is driven from the same prime mover (not shown) as are the drive rolls 30 and 31 for the belt 21, and the cage 11 thus rotates in timed relationship with helical movement of the belt 21 about the mandrel 10. The web $b$ is unwound from the satellite roll 12 with this rotation of the spider 11 and travels from the roll 12 over the guide bar 87 and onto the web $a$ carried by the belt 21 passing over the mandrel 10. The web $c$ unwinds from the satellite roll 13 as the cage 11 rotates about the mandrel 10, and the web $c$ passes over the guide bar 96 onto the web $a$ disposed on the surface of the belt 21. The width of the satellite rolls 12 and 13 and of the webs $b$ and $c$ and the other constants of the system, as will be hereinafter referred to, are such that the complete outer surface of the web $a$ is covered by the webs $b$ and $c$; and the webs $b$ and $c$ overlap slightly and have their longitudinal dimensions extending at an angle, such as 90°, with respect to the longitudinal dimension of the web $a$.

The slitter 126 is so positioned that the slitter wheel 127 is effective to cut the webs $b$ and $c$ along the radially extending rib 16. The web $a$ thus leaves the mandrel 10 positioned on the belt 21 with segments of the webs $b$ and $c$ extending transversely across the web $a$ and overlapping to a slight extent.

The tension with which the webs $b$ and $c$ are wound onto the web $a$ traveling with the belt 21 helically about the mandrel 10 is controlled by means of the herringbone rolls 56 and 60. The herringbone rolls 56 and 60 are respectively held in contact with the surfaces of the rolls 12 and 13 as the rolls 12 and 13 unwind, and the herringbone rolls 56 and 60 are driven in timed relationship with respect to movement of the belt 21 over the mandrel 10 and with respect to the rate of rotation of the spider 11. The power drive unit 69, which drives the cage 11 and which is driven by the same prime mover (not shown) driving the belt 21, also drives the herringbone rolls 59 and 60; and the drive for the latter from the power drive unit 69 is through the sprocket 77, the belt 78, the sprocket 79, the shaft 80, the sprocket 81, the belt 82, the sprocket 83, the infinitely adjustable speed change device 84, the sprocket 85, and the belt 86 to the bearing shell 72. The belt 75 and sprocket 74 drive the roll 56 from the bearing shell 72, and the belt 76 and sprocket 77 drive the roll 60 from the bearing shell 72.

Figure 9:
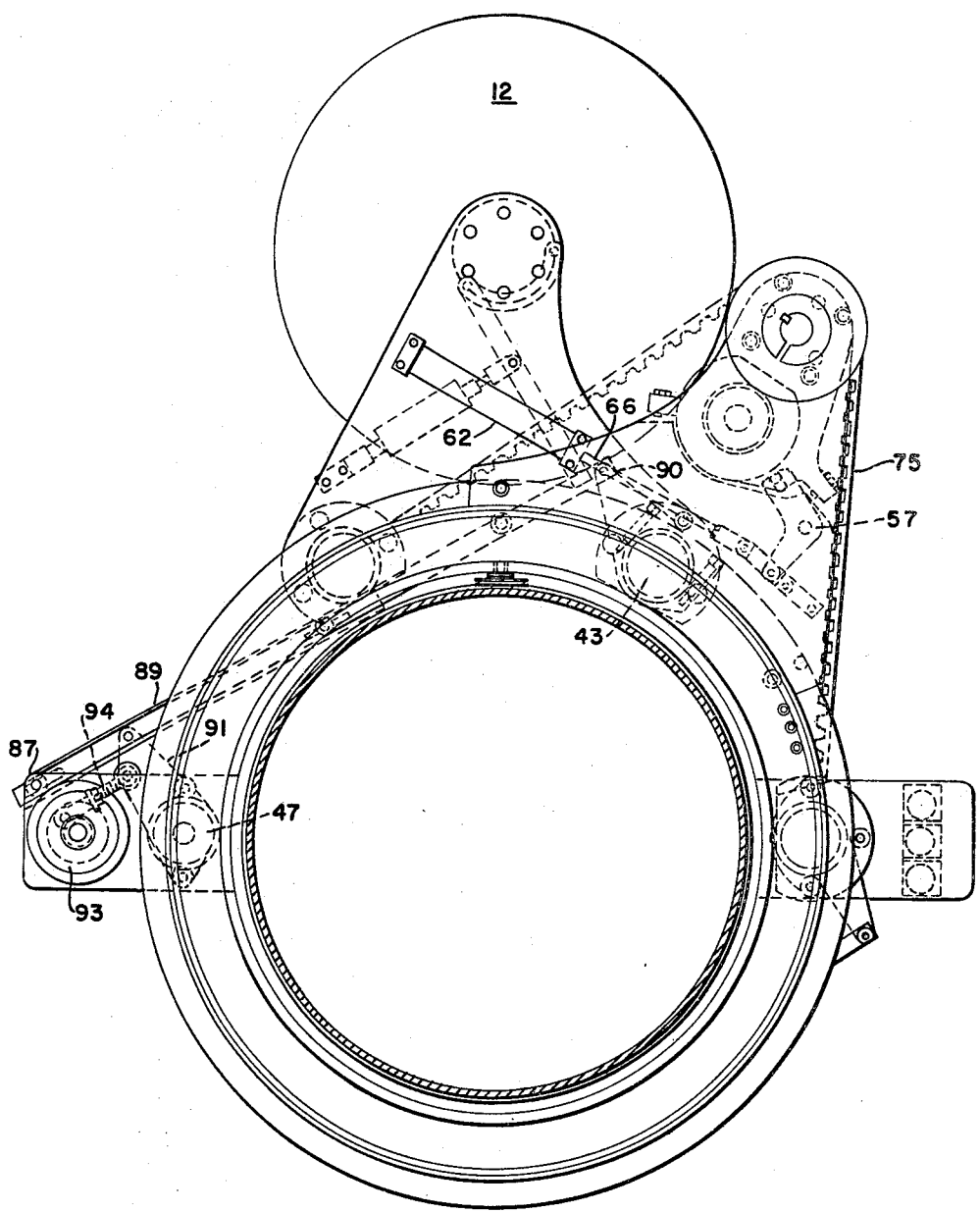
FIG. 9 is an end view of a portion of the apparatus on an enlarged scale also taken from line 8—8 of FIG. 5.

Each of the herringbone rolls 56 and 60 is moved by means of the pistons 62 to keep it into engagement with the surface of the associated satellite roll 12 or 13 as the rolls 12 and 13 decrease in diameter. As the satellite roll 12, for example, decreases in diameter, the pistons 62 for the arms 50 and 51 are effective to rotate the arm portions 51a and 51b, and the corresponding arm portions 50a and 50b of the arm 50, counterclockwise, as seen in FIGS. 9 and 10, so as to keep the herringbone roll 56 in contact with the roll 12, this rotation of these arm portions being by virtue of the bell cranks 63 which are rotated in the clockwise direction about their pins 64 (see FIG. 10).

The amount of overlap of the webs $b$ and $c$, as these webs are wound onto the web $a$ traveling along with the belt 21, may be controlled by adjusting the sheet guide bar 87. The eccentric 93 is rotated by means of the motor 95, and the levers 91 fixed onto the rod 47 are thereby rotated in one direction or the other. The levers 91, being pivotally connected with the bars 88 and 89, move these bars along with the sheet guide bar 87, with the levers 90 swinging slightly about the rod 43.

The webs $a$, $b$ and $c$ preferably have thermoplastic material in them. This material may be in the form of threads or fibers within a cellulose wadding sheet or may include a complete sheet of thermoplastic material bonded to a wadding sheet, for example. The web $a$, with segments of the webs $b$ and $c$ lying crosswise of the web $a$, travels along with the belt 21 to the roll 31 and from thence downwardly to the vacuum box 132; and the small diameter belts 152, 152a, etc., hold the transversely extending segments of the webs $b$ and $c$ in place on the web $a$ drawing this travel of the web $a$. The vacuum box 132 holds the segments of the webs $b$ and $c$ on the upper surface of the web $a$ as the web $a$ and the segments of the webs $b$ and $c$ pass through the heated calender 133, and a preliminary bonding between the webs $a$, $b$ and $c$ is accomplished by the heated calender 137. Additional bonding together of the webs $a$, $b$ and $c$ take place as the webs pass over the heated rolls 134, 135 and 136 and through the heated calender 137. The thermoplastic material in the composite web is firmly set as it passes over the cooling rolls 138 to 141, and the composite material is then wound into the roll 151 by means of the winder 142.

The cores 101 of expired satellite rolls 12 and 13 may be removed from their supporting saddles 102 and 103 utilizing the apparatus illustrated in FIG. 12. The spider 11 is rotated so that the arms 122 may move between two opposite saddles 102 and 103, and a core 101 may be lifted out of the saddles and may roll down the declining arms 122 onto the horizontal beams 114 for subsequent removal. The spider 11 is then rotated through a portion of a revolution so that these saddles 102 and 103 are in position to receive a new satellite roll, and the arms 116 may be rotated in the counterclockwise direction, as seen in FIG. 12, in order that a satellite roll may roll down the arms 116 into position in the saddles 102 and 103. The saddle portions 119 on their ends of the arms 116 engage the ends of a core 101 so as to move it toward the other ends of the arms 116 and to prevent a second satellite roll from moving along with the first one. The pressure cylinders 120 and 124 are utilized for moving the arms 122 and 116 as just described.

After positioning a new satellite roll with its core 101 within opposite saddles 102 and 103, each of the saddles is closed by means of its cover 104 to hold the satellite roll in position. This is accomplished by energizing the associated air cylinder 111 which straightens out the associated toggle linkage 106 and moves the cover 104 over the associated saddle 102 or 103.

The same mathematical relationships as set forth in Equations 1 to 9 in columns 7 and 8 of H. W. Hirschy Patent 2,841,202 apply to the crosslaying machine described herein; and FIG. 12 hereof is based on FIG. 11 of the Hirschy patent which is explanatory of the Hirschy equations, except that, for the most part, designations of certain angles have been added in FIG. 12 hereof. The cross sheets $b$ and $c$ in the present machine are narrower than the main sheet $a$; and, therefore, instead of a single cross sheet, the two cross sheets $b$ and $c$ are used in the present instance. These two cross sheets are applied onto the mandrel 10 in the same direction; and they, therefore, may be represented by the two longitudinal halves of the cross sheet illustrated in FIG. 12 hereof. The angles $\alpha$ and $\theta$, as defined in column 7 of the Hirschy patent apply to each of the cross sheets $b$ and $c$, and it may be shown geometrically from FIG. 12 hereof that the edges of the cross sheets $b$ and $c$ define the angle ABC which is $90° + \alpha - \theta$. The angle ABC, both in the Hirschy patent and also herein, indicates the direction of movement of the cross sheet or sheets with respect to a plane passing through both the longitudinal center line of the mandrel and also through the tangent line at which the cross sheet or sheets first contact the outer surface of the mandrel or the outer surface of the belt carried by the mandrel.

Figure 11:
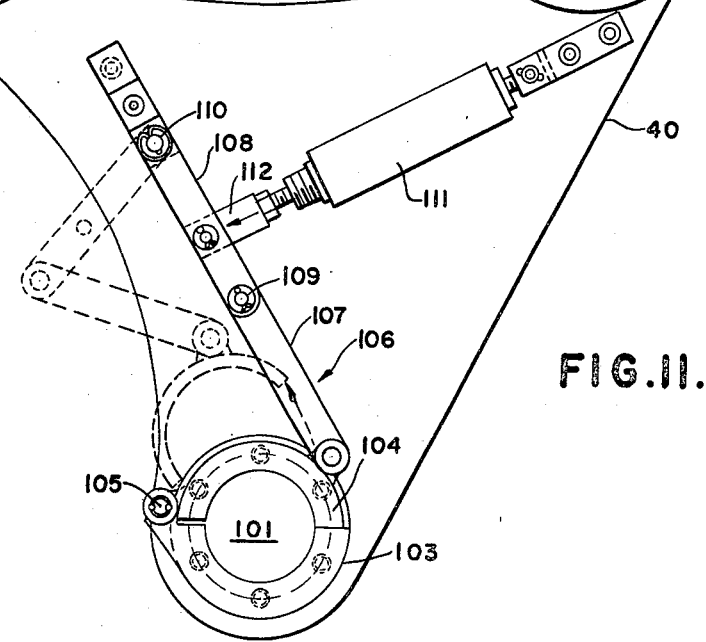
FIG. 11 is another fragmentary view also taken from line 10—10 of FIG. 5.

In the present instance, the angle ABC $(90° + \alpha - \theta)$ is 45° while, in the Hirschy FIG. 11, this angle may be scaled off at about 54°. Both of the satellite rolls 12 and 13 are on longitudinal axes that are parallel to the central longitudinal axis of the mandrel 10; and, in order that the sheets $b$ and $c$ may travel from these satellite rolls smoothly without wrinkles, the sheet guide bars 87 and 96 each lie at one-half of this angle of 45° (or 22½°) with respect to a line normal to one of the side supporting bars 88, 89, 97 and 98 that support the sheet guide bars 87 and 96. Stated another way, each of the sheet guide bars 87 and 96 is at a complementary angle of 67½° with respect to its side supporting bars, and these angular measurements are made in the same plane that is defined by each sheet guide bar and its side supporting bars 88, 89, 97 and 98. As will be noted from the drawings, these planes for the sheet guide bars 87 and 96 are substantially tangent with and have only a slight spacing from the periphery of the belt 21 carried by the mandrel 10. It will be apparent from FIG. 9, for example, that the plane defined by the sheet guide bar 87 and its support bars 88 and 89 is nearly tangent to the external surface of the belt 21 and therefore this plane is also parallel to the axes of the cage 11 and mandrel 10.

Utilizing the mathematics set forth in the Hirschy patent as just mentioned, the two sheets $b$ and $c$, instead of being applied onto the mandrel 10 at an angle ABC of 45°, may be applied onto the mandrel 10 at some other angle. In this case, the angle of 22½° of a sheet guide bar with respect to a line normal to the associated side support bar would instead be an angle of one-half of the angle ABC that is actually used.

The widths of the two webs $b$ and $c$ are preferably such that there is some slight overlapping of the webs $b$ and $c$ as they are wound onto the web $a$. This overlapping may be varied by speeding up cage 11 (rolls 12 and 13) by means of transmission 69 or by energizing the motor 95 to shift the eccentric 93 and thereby move the sheet guide bar 87 slightly. The sheet guide bars 87 and 96 are, in general, disposed exactly oppositely to each other with respect to the central axis of the mandrel 10, and the diagonally opposite ends of the sheet guide bars 87 and 96 are disposed at equal distances from the longitudinal center line of the mandrel 10. Advantageously, the herringbone rolls 56 and 60 are continuously held in contact with the peripheries of the satellite rolls 12 and 13, and the tension on the webs $b$ and $c$, as they are being wound onto the web $a$, can be controlled and changed during operation of the machine by changing the speed ratio of the speed change device 84. The amount of overlap between the sheets $b$ and $c$ and the smoothness with which the sheets are laid onto the sheet $a$ may thus be controlled without shutting down the machine.

In view of the fact that the satellite rolls 12 and 13 have their axes extending parallel with the central axis of the mandrel 10, the rolls 12 and 13 may be easily replaced after the webs $b$ and $c$ have been substantially completely unwound from them. This replacement is easily accomplished by the mechanism shown in FIG. 13.

The belts 152, 152$a$, etc., function to assure that the segments of the webs $b$ and $c$ lying crosswise of the web $a$ remain in position on the web $a$ as it travels toward the terminal end of the machine, and the vacuum box 132 advantageously has a similar function in holding the web segments onto the web $a$ as the web $a$ and the segments move into the heated calender 133.

What is claimed is:

1. An apparatus for forming a continuous web product comprising a mandrel, means for depositing a first elongate flexible web on said mandrel so that the web may move helically about the mandrel, a rotatable carrier disposed about said mandrel, means for mounting a supply roll of a second elongate flexible web on said carrier so that the axis of the roll is substantially parallel with the axis of said mandrel, a guide bar for guiding said second web from its supply roll over said first web as the first web is passing over said mandrel, said second web being applied in the form of a helix which is wrapped around said first web in such relationship that the long dimension of said second web is maintained at a uniform substantial angle to the long dimension of said first web and means for cutting said second web transversely of its long dimension after said second web has been applied to said first web.

2. An apparatus as set forth in claim 1 and including a flexible endless belt helically disposed about said mandrel for carrying said first web about the mandrel and means for moving the belt about the mandrel, said carrier having an axis of rotation substantially coinciding with the axis of said mandrel.

3. An apparatus as set forth in claim 2, said guide bar being disposed in a plane which passes in close proximity to and parallel to the exterior surface of said belt.

4. An apparatus as set forth in claim 3, and including a second web supply roll and a second guide bar similar to and positioned similarly on said carrier to said first named web supply roll and said first named guide bar respectively but substantially at 180° with respect to said first named web supply roll and said first named guide bar respectively about the axes of said mandrel and carrier.

5. An apparatus as set forth in claim 2, said guide bar being located in a plane that passes in close proximity to the external surface of said belt, and said guide bar being disposed with respect to a line parallel to the axis of said mandrel at an angle that is one-half the angle of approach of said second web onto the said first web measured from a plane passing through the axis of said mandrel and through the line at which said second web makes contact with said first web.

6. An apparatus for forming a continuous web product comprising a mandrel, means for depositing a first elongate flexible web on said mandrel so that the web may move helically about the mandrel, a rotatable carrier disposed about said mandrel, means for mounting a supply roll of a second elongate flexible web onto said carrier so that the web from said supply roll may be applied in the form of a helix which is wrapped around said first web in such relationship that the long dimension of said second web is maintained at a uniform substantial angle with the long dimension of said first web, means for cutting said second web transversely of its long dimension after said second web has been applied to said first web, a control roll in contact with the peripheral surface of said supply roll for controlling the tension with which said second web is applied onto said first web, and means for moving said control roll toward the axis of said supply roll so that the control roll may remain in contact with the periphery of said supply roll as the supply roll decreases in diameter as the second web is withdrawn from the supply roll.

7. An apparatus as set forth in claim 6, and including a flexible endless belt helically disposed about said mandrel for carrying said first web about the mandrel and means for moving the belt about the mandrel, said carrier having an axis of rotation substantially coinciding with the axis of said mandrel.

8. An apparatus as set forth in claim 7, and means for braking the rotation of said control roll for thereby braking the rotation of said supply roll.

9. An apparatus as set forth in claim 7, and including means for driving said control roll in timed relationship with the rotation of said carrier about said mandrel and with the movement of said belt about said mandrel for thereby controlling the tension of the web drawn from said supply roll.

10. An apparatus as set forth in claim 7 and including a second supply roll of a third elongate flexible web also carried by said carrier and helically wound onto said first web along with said second web and a second control roll mounted similarly to said first control roll and effective on said second supply roll in the same manner as said first named control roll is effective on said first named supply roll, said second supply roll and said second control roll being respectively mounted at 180° on said carrier with respect to said first name supply roll and said first named control roll.

11. An apparatus for forming a continuous web product comprising a mandrel, means for depositing a first elongate flexible web on said mandrel so that the web may move helically about the mandrel, a rotatable carrier disposed about said mandrel, means for mounting a supply roll of a second elongate flexible web on said carrier so that the second web is applied in the form of a helix which is wrapped around said first web in such relationship that the long dimension of said second web is maintained at a uniform substantial angle to the long dimension of said first web, means for cutting said second web transversely of its long dimension at the edges of said first web after said second web has been applied to said first web, a plurality of belts, and means for movably mounting said belts so that they have passes extending in close proximity to and longitudinally of said first web as it travels away from said cutting means for maintaining the segments of said second web produced by said cutting means in contact with said first web without substantial disturbance thereon due to windage.

12. An apparatus as set forth in claim 11, at least one of said webs including a thermoplastic material, a heated calender for calendering the segments of said second web onto said first web so as to affix them together, and a vacuum box effective on the underside of said first web and disposed in the line of travel of said first web subsequent to said belts for holding the segments of said second web in contact with said first web as the first web passes into said calender.

References Cited

UNITED STATES PATENTS

| | | | |
|---|---|---|---|
| 1,544,546 | 7/1925 | Baker | 156—425 |
| 2,696,244 | 12/1954 | Jackson | 156—439 |

BENJAMIN A. BORCHELT, Primary Examiner

T. H. WEBB, Assistant Examiner